United States Patent [19]
Sakai et al.

[11] Patent Number: 5,389,050
[45] Date of Patent: Feb. 14, 1995

[54] VEHICLE AUTOMATIC TRANSMISSION CONTROL SYSTEM USING FUZZY LOGIC TO DETERMINE SLOPE AND AN INFERRED DRIVER'S INTENTION TO DECELERATE (DEC) TO DETERMINE THE CORRECT GEAR POSITION

[75] Inventors: Ichiro Sakai; Yoshihisa Iwaki; Takashi Haga; Shinichi Sakaguchi; Yukihiko Suzaki, all of Saitama, Japan

[73] Assignee: Honda Giken Kogyo Kabushiki Kaisha, Tokyo, Japan

[21] Appl. No.: 940,435

[22] Filed: Sep. 4, 1992

[30] Foreign Application Priority Data

Sep. 12, 1991 [JP] Japan .................................. 3-260951
Sep. 12, 1991 [JP] Japan .................................. 3-260952

[51] Int. Cl.⁶ ........................ B60K 41/06; B60K 41/04
[52] U.S. Cl. ........................................ 477/78; 477/138; 477/901; 477/904; 364/424.1
[58] Field of Search ................. 74/866; 364/424.1; 477/138, 139, 144, 148, 901, 904, 78

[56] References Cited

U.S. PATENT DOCUMENTS

| | | | |
|---|---|---|---|
| 3,823,621 | 7/1974 | Kubo et al. | 74/866 |
| 4,688,452 | 8/1987 | Ayoyama et al. | 74/869 |
| 4,841,815 | 6/1989 | Takahashi | 364/424.1 |
| 4,930,084 | 5/1990 | Hosaka et al. | 364/424.1 |
| 5,005,133 | 4/1991 | Takahashi | 364/426.04 |
| 5,019,979 | 5/1991 | Takahashi | 74/866 X |
| 5,036,730 | 8/1991 | Sakai et al. | 74/866 |
| 5,067,374 | 11/1991 | Sakai et al. | 74/866 |
| 5,079,704 | 1/1992 | Sakai et al. | 364/424.1 |
| 5,079,705 | 1/1992 | Sakai et al. | 364/424.1 |
| 5,101,350 | 3/1992 | Tokoro | 364/424.1 |
| 5,303,153 | 4/1994 | Sakai et al. | 364/424.1 |

FOREIGN PATENT DOCUMENTS

| | | |
|---|---|---|
| 0347261 | 12/1989 | European Pat. Off. . |
| 0347263 | 12/1989 | European Pat. Off. . |
| 0352551 | 1/1990 | European Pat. Off. . |
| 0375155 | 6/1990 | European Pat. Off. . |
| 0454504 | 10/1991 | European Pat. Off. . |

Primary Examiner—Dirk Wright
Assistant Examiner—Khoi Q. Ta
Attorney, Agent, or Firm—Lyon & Lyon

[57] ABSTRACT

In a control system for controlling a gear ratio of a multi-step geared or continuously variable automatic transmission, the driver's intention to decelerate is inferred by carrying out a first fuzzy reasoning using a degree of throttle opening or the like and then the target gear ratio is determined by carrying out a second fuzzy reasoning using parameters including the inferred driver's intention to decelerate. The first fuzzy reasoning is carried out using fuzzy production rules classified by operating conditions such as a road profile and a vehicle speed. The inferred driver's intention to decelerate is canceled if braking is discontinued. Thus the control ascertain the intention of the driver and is thus possible to achieve sophisticated shift scheduling well matched to the sensibilities of the driver.

9 Claims, 14 Drawing Sheets

FIG. 5

| Rule number | Rule type | Subject | Antecedent | | | Conclusion | Rule meaning |
|---|---|---|---|---|---|---|---|
| 1 | Basic rule | Ordinary driving | V (km/h) | Current gear | | Gear (ratio) -3-2-1 0 1 2 3 | If vehicle speed is high and current gear is low (gear ratio is large), then shift up greatly (lower gear ratio greatly). |
| 2 | " | " | V | Current gear | | -3 " | If vehicle speed is low and current gear is high (gear ratio is small), then shift down greatly (raise gear ratio greatly). |
| 3 | " | " | θ_TH | V | | 3 " | If degree of throttle opening is small and vehicle speed is high, then shift up greatly (lower gear ratio greatly). |
| 4 | " | " | θ_TH | V | | 1 " | If degree of throttle opening is small and vehicle speed is low, then shift up slightly (lower gear ratio slightly). |
| 5 | " | " | θ_TH | V | | -1 " | If degree of throttle opening is large and vehicle speed is high, then shift down slightly (raise gear ratio slightly). |
| 6 | " | " | θ_TH | V | | -3 " | If degree of throttle opening is large and vehicle speed is low, then shift down greatly (raise gear ratio greatly). |

FIG.6

| Rule number | Rule type | Subject | Antecedent | | | Conclusion | Rule meaning |
|---|---|---|---|---|---|---|---|
| 7 | Extra rule | Hill-climbing | Driving resistance 100-192(kg) | θ_TH 0–84(deg) | V (km/h) 20 40 250 | Gear (ratio) -3-2-1 0 1 2 3 / Current gear 1 2 3 4 | During hill-climbing if degree of throttle opening is small, then shift down greatly (raise gear ratio greatly). |
| 8 | // | // | ← | θ_TH 0–84 | ← | -3 / 1 2 3 4 | During hill-climbing if current gear is high (gear ratio is small) and degree of throttle opening is large, then shift down greatly (raise gear ratio greatly). |
| 9 | // | Hill-descent | Driving resistance -128–0 | θ_TH 0–10.5 | | -3 / 1 2 3 4 | During hill-descending shift down greatly (raise gear ratio greatly) to provide engine braking. |
| 10 | // | Deceleration | DEC 0–1 | | | -3 / 1 2 3 4 | If driver's intention to decelerate (DEC) exists and current gear is high (gear ratio is small), then shift down greatly (raise gear ratio greatly) to provide engine braking. |
| 11 | // | // | DEC 0–1 | | | 0 / 1 2 3 4 | If driver's intention to decelerate (DEC) exists and current gear is third (gear ratio is somewhat large), then hold current gear (ratio) to maintain engine braking. |

FIG. 7

| Rule number | Rule type | Subject | Antecedent | | | | Conclusion | Rule meaning |
|---|---|---|---|---|---|---|---|---|
| 12 | Extra rule | DEC | $V_{BRK}$(km/h) | $a$(m/s²) | $\theta_{TH}$ | Grade resistance (kg) | DEC | If accelerator is released during hill-descending and slight deceleration occurs, then it can be presumed that driver's intention to decelerate (DEC) is increasing. |
| 13 | // | // | ← | $a$ | ← | Grade resistance (kg) $V$(km/h) | DEC | If accelerator is released during low-speed driving on level or uphill road and fairly large deceleration occurs, then it can be presumed that driver's intention to decelerate (DEC) is increasing. |
| 14 | // | // | ← | $a$ | ← | $V$ | DEC | If accelerator is released during high-speed driving on level or uphill road and large deceleration occurs, then it can be presumed that driver's intention to decelerate (DEC) is increasing. |
| 15 | // | // | | | $\theta_{TH}$ | | DEC | If accelerator is depressed, then it can be presumed that driver's intention to decelerate (DEC) is decreasing. |

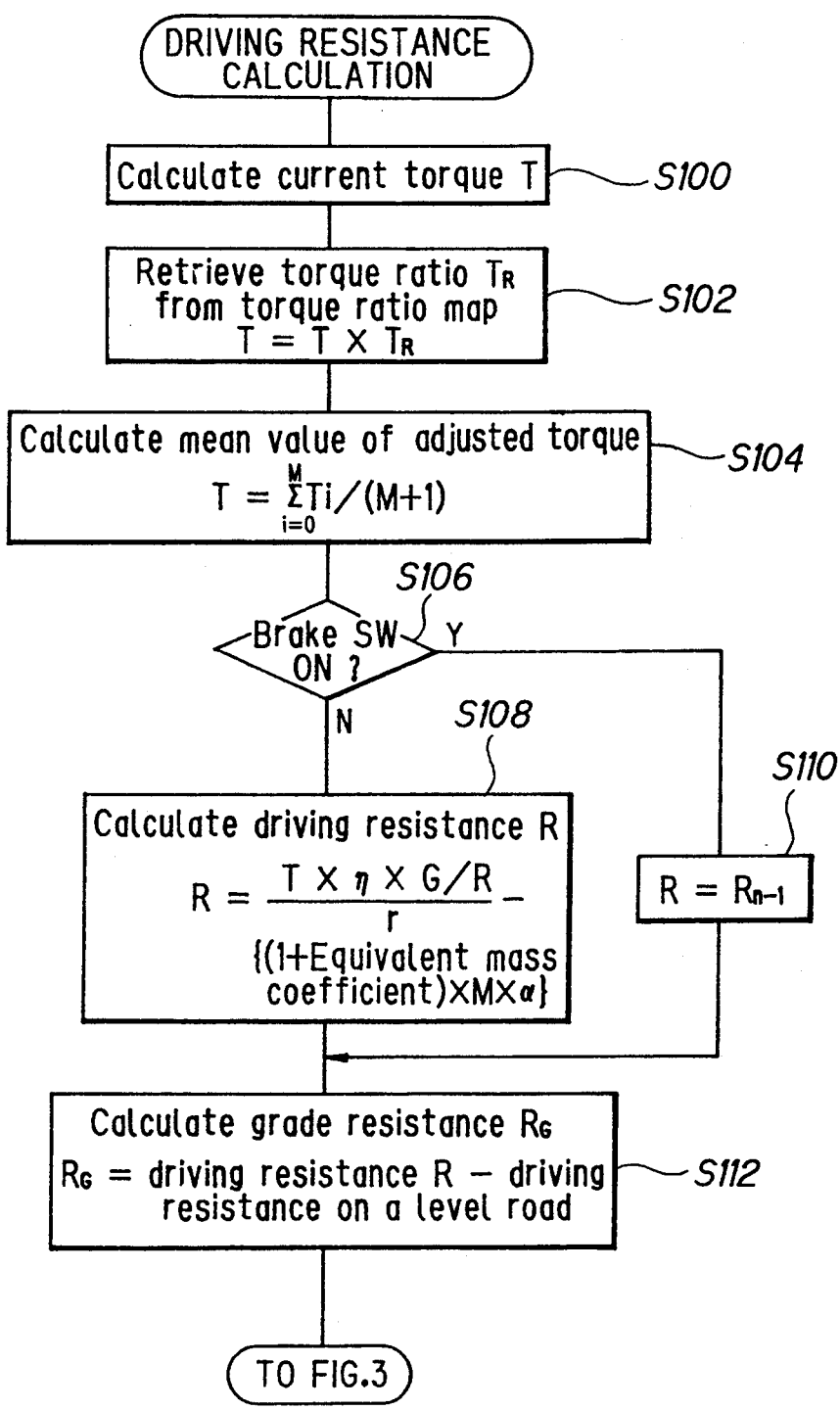

VEHICLE AUTOMATIC TRANSMISSION CONTROL SYSTEM USING FUZZY LOGIC TO DETERMINE SLOPE AND AN INFERRED DRIVER'S INTENTION TO DECELERATE (DEC) TO DETERMINE THE CORRECT GEAR POSITION

BACKGROUND OF THE INVENTION

1. Field of the Invention

This invention relates to a vehicle automatic transmission control system, more particularly to such a system in which the intention of the driver is inferred and the control values are determined on the basis of parameters including the inferred value.

2. Description of the Prior Art

People today no longer consider vehicles to be simply transporters but want a vehicle that provides operability and controllability matched to human sensibilities. For example, the driver of a vehicle equipped with an automatic transmission wants and expects operability and controllability on a level with a vehicle having a manual transmission when it is operated by an expert driver, even when driving through mountainous areas. For meeting this desire, the assignee has developed a wide range of technologies relating to vehicle automatic transmission control systems using fuzzy logic. These are disclosed, for example, in Japanese Laid-open Patent Publications No. 2(1990)-3739 and No. 2(1990)-85563 (also filed in the United States to mature as U.S. Pat. No. 5,036,730 and filed in EPO under 89306192.9); No. 2(1990)-3738 (also filed in the United States to mature as U.S. Pat. No. 5,079,705 and filed in EPO under 89306167.1); No. 2(1990)-138,558 and No. 2(1990)-138,561 (also filed in the United to mature as U.S. Pat. No. 5,067,374 and filed in EPO under 89311976.8); No. 2(1990)-138,559, No. 2(1990)-138,560 and No. 2(1990)-150,558 (also filed in the United States to mature as U.S. Pat. No. 5,079,704 and filed in EPO under 89311970.1); and No. 4(1992)-8964 (also filed in the United States under Ser. No. 691,066 and EPO under 91303878.2).

For achieving the desired sophisticated control matched to the sensibilities of the driver it is preferable to conduct reasoning for inferring the driver's intention and then to determine the control values based on various parameters including the inferred value. To this end, as disclosed in aforesaid Japanese Laid-open Patent Publication No. 4(1992)-8964 (U.S. Ser. No. 691,066), the assignee developed a control system in which fuzzy reasoning is used for inferring the driver's intention to decelerate from the engine load and the amount of vehicle acceleration/deceleration.

An object of the invention is to provide a vehicle automatic transmission control system that is an improvement on the system developed earlier by the assignee, specifically a vehicle automatic transmission control system which ascertains the intention of the driver with increased precision is thus able to achieve sophisticated shift scheduling well matched to the sensibilities of the driver.

Another object of the invention is to provide a vehicle automatic transmission control system which by ascertaining the intention of the driver is able to achieve control faithful to the driver's intention.

For realizing these objects, the present invention provides a system for controlling a multi-step geared or continuously variable automatic transmission of a vehicle, including first means for determining parameters at least indicative of an engine load, a vehicle speed and a driving resistance, second means for carrying out a first fuzzy reasoning to infer a value indicative of the driver's intention to decelerate or accelerate and third means for carrying out a second fuzzy reasoning using the parameters and the inferred values to determine a gear ratio to be shifted to. In the system, the improvement comprises said second means carries out the first fuzzy reasoning at least using parameters indicative of an engine load and a parameter indicating if the vehicle is hill climbing or hill descending.

BRIEF DESCRIPTION OF THE DRAWINGS

These and other objects and advantages of the invention will be more apparent from the following description and drawings, in which:

FIG. 5 is a chart showing fuzzy production rules used in a second fuzzy reasoning referred to in FIG. 3 flow chart to determine a target gear ratio;

FIG. 6 is a chart showing similar rules also used in the second fuzzy reasoning referred to in FIG. 3 flow chart;

FIG. 7 is a chart showing fuzzy production rules used in a first fuzzy reasoning referred to in FIG. 3 flow chart to determine driver's intention to decelerate;

FIG. 8 is a flow chart showing driving resistance calculation referred to in FIG. 3 flow chart;

DETAILED DESCRIPTION OF THE PREFERRED EMBODIMENTS

Figure 1:
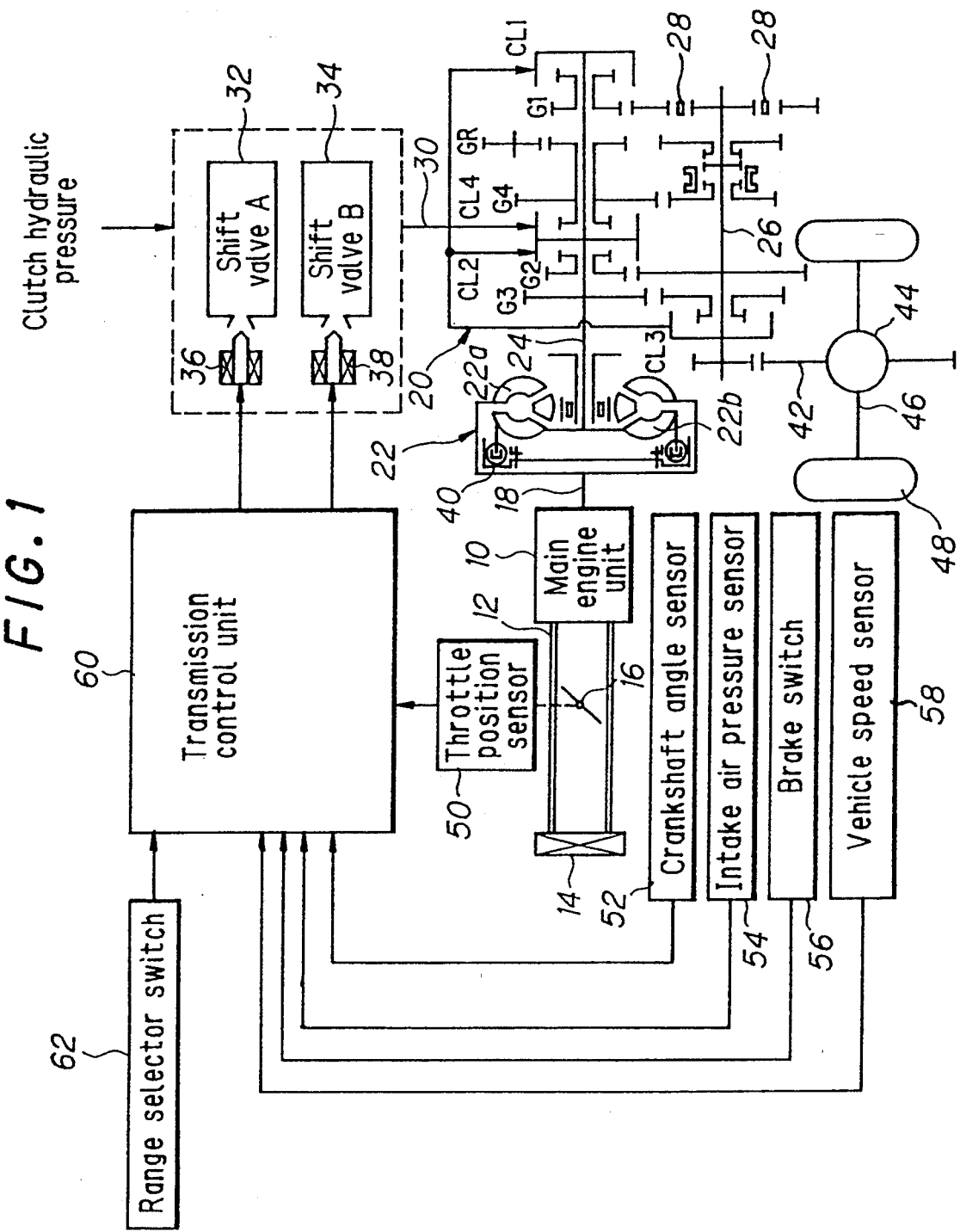
FIG. 1 is a schematic diagram showing the overall arrangement of a vehicle automatic transmission control system according to the present invention.

FIG. 1 is a schematic diagram showing the overall arrangement of the automatic transmission control system according to the present invention, in which the reference numeral 10 denotes the main unit of an internal combustion engine. The main engine unit 10 is connected with an air intake passage 12 having an air cleaner 14 attached to its far end. The flow rate of intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver's seat. A fuel injection valve (not shown) for supplying fuel to the engine is provided at an appropriate portion of the air intake passage 12 in the vicinity of the combustion chamber (not shown). The intake air mixed with the fuel enters the combustion chamber and, after being compressed by a piston (not shown), is ignited by a spark plug (not shown). The fuel-air mixture burns explosively and drives the piston. The motive force of the piston is converted into rotating motion which is made available at an output shaft 18.

The stage following the main engine unit 10 is a transmission 20. The output shaft 18 is connected with a torque converter 22 of the transmission 20 and is linked with a pump impeller 22a thereof. A turbine runner 22b of the torque converter 22 is connected with a main shaft 24 (the transmission input shaft). A countershaft 26 (the transmission output shaft) is provided in parallel with the main shaft 24 and between the two shafts there are provided a first speed gear G1, a second speed gear G2, a third speed gear G3, a fourth speed gear G4 and a reverse gear GR, and these gears are provided respectively with multi-plate hydraulic clutches CL, CL2, CL3, and CL4 (the clutch for the reverse gear is omitted from the drawing in the interest of simplicity). The first speed gear G1 is further provided with hydraulic one-way clutches 28. These hydraulic clutches are connected with a source of hydraulic pressure (not shown) by a hydraulic line 30, and a shift valve A 32 and a shift valve B 34 are provided in the hydraulic line 30. The positions of the two shift valves are changed by the energization/deenergization of respective solenoids 36 and 38, whereby the supply/removal of hydraulic pressure to/from the aforesaid clutches is controlled. Reference numeral 40 designates a lock-up mechanism of the torque converter 22. The countershaft 26 is connected with a differential 44 through a propeller shaft 42, and the differential 44 is connected with wheels 48 through a drive shafts 46. The speed-adjusted engine output is transmitted to the wheels through this power train.

In the vicinity of the throttle valve 16 of the air intake passage 12 there is provided a throttle position sensor 50 such as a potentiometer or the like for detecting the degree of opening of the throttle valve 16. In the vicinity of a rotating member (e.g. a distributor; not shown) of the main engine unit 10 there is provided a crankshaft angle sensor 52 such as an electromagnetic pickup or the like. The crankshaft angle sensor 52 detects the position of the piston in terms of the crankshaft angle and produces a signal once every prescribed number of degrees of crankshaft rotation. At an appropriate location downstream of the throttle valve 16 of the air intake passage 12 there is provided an intake air pressure sensor 54 for detecting the absolute pressure of the intake air. In the vicinity of the brake pedal (not shown) provided on the vehicle floor in the vicinity of the drive's seat there is provided a brake switch 56 for detecting depression of the brake pedal. At an appropriate location near one of the drive shafts 46 there is further provided a vehicle speed sensor 58 such as a reed switch or the like, which produces a signal once every prescribed number of degrees of drive shaft rotation. The outputs of the sensors are sent to a transmission control unit 60. The transmission control unit 60 also receives the output from a range selector switch 62 for detecting the selected position of a range selector.

Figure 2:
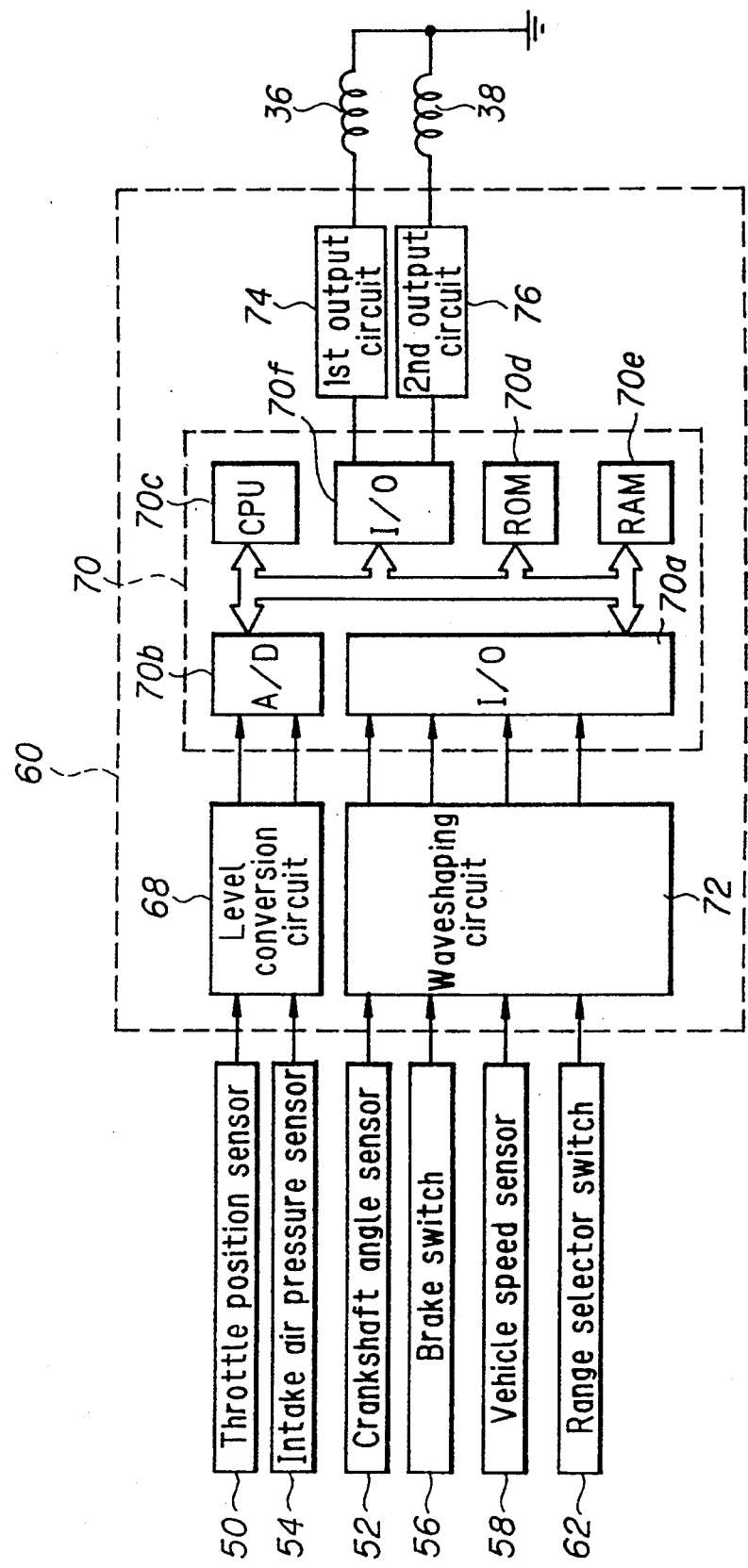
FIG. 2 is a block diagram showing the control unit shown in FIG. 1.

FIG. 2 is a block diagram showing the transmission control unit 60 in detail. As shown in this figure, the analog outputs from the throttle position sensor 50 and the like are input to a level conversion circuit 68 in the transmission control unit 60 for amplification and the amplified signals are forwarded to a microcomputer 70. The microcomputer 70 has an input port 70a, an A/D (analog/digital) converter 70b, a CPU (central processing unit) 70c, a ROM (read-only memory) 70d, a RAM (random access memory) 70e, an output port 70f and groups of registers (not shown) and counters (not shown). The output from the level conversion circuit 68 is input to the A/D converter 70b whereby it is converted into digital values, and the digital values are stored in the RAM 70e. The outputs from the crankshaft angle sensor 52 and the like are first waveshaped in a waveshaping circuit 72 and then input to the microcomputer through the input port 70a to be stored in the RAM 70e. On the basis of the input values and calculated values derived therefrom, the CPU 70c determines a gear position (gear ratio) in a manner to be explained later. In response to the result of the determination, a control value is sent through the output port 70f to a first output circuit 74 and a second output circuit 76 which energize/deenergize the solenoids 36 and 38 so as to shift gears or hold the current gear position as determined.

The operation of the control system will now be explained with respect to the flow charts of FIG. 3 and later figures.

Figure 4:
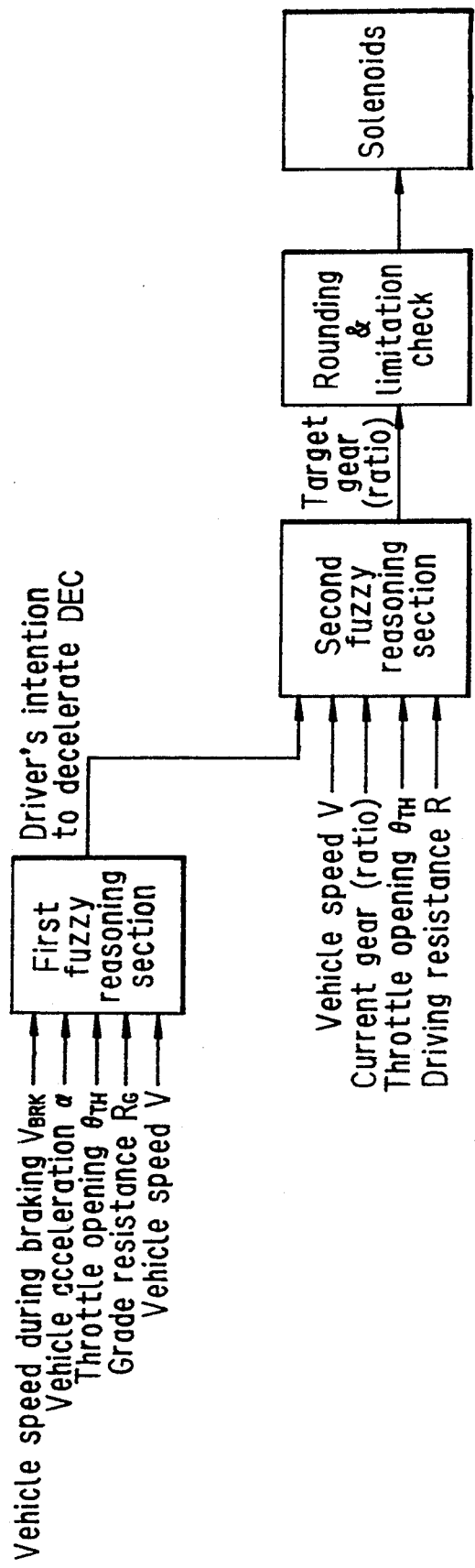
FIG. 4 is an explanatory block diagram showing the characteristic feature of the control system according to the present invention.

Before going into a detailed description, however, the general features of the control system will first be explained with reference to FIG. 4. The system according to the invention determines the driver's intention to decelerate by conducting a first fuzzy reasoning on the basis of throttle opening etc. and then conducts a second fuzzy reasoning based on prescribed parameters, among which is included the value obtained in the first fuzzy reasoning, for determining a gear ratio (position). FIGS. 5-7 show a set of fuzzy production rules used in the fuzzy reasoning. Among these, rules 1-6 are rules relating to ordinary or general driving circumstances (basic rules) and rules 7-11 are rules relating to special, limited driving circumstances such as hill-climbing or the like (extra rules). Rules 10 and 11 among the extra rules use the driver's intention to decelerate as one of the parameters in the reasoning. Rules 12-15 are a set of rules for inferring the driver's intention to decelerate, expressed briefly as "DEC" in the figures, namely the set of rules used in the aforesaid first fuzzy reasoning. In the fuzzy reasoning (inference), various operating parameters used in the rule groups are obtained and the value to be output is determined by reasoning using membership functions corresponding to the operating parameters defined by the rules. As the output (i.e. value arrived at by the reasoning) frequently includes a fractional part such as 0.8, it is rounded to an integral value before being used to specify the gear position (ratio) and the rounded value is subjected to a limitation check before being output to the solenoids so as to ensure that its value does not exceed the highest gear position of the transmission.

Figure 3:
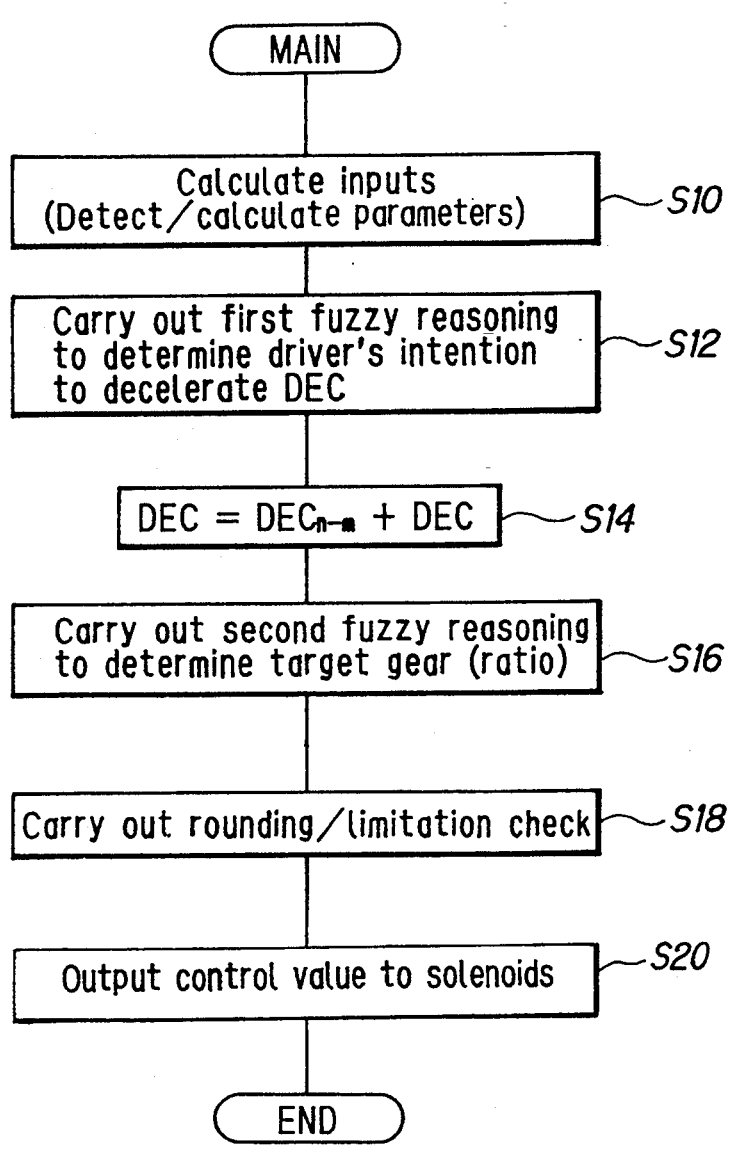
FIG. 3 is a main routine flow chart showing the operation of the control system according to the present invention.

As shown in FIG. 3, therefore, the procedure begins with the calculation of inputs in step S10, more specifically with the detection and calculation of the parameters to be used in the fuzzy reasoning. The fuzzy reasoning parameters related to rules 1–11 are the vehicle speed V (km/h), the current gear position (ratio), the throttle opening $\theta$TH [0°–84° (WOT)], the driving resistance (kg) and the driver's intention to decelerate DEC. The fuzzy reasoning parameters related to rules 12–15 are the vehicle speed during braking VBRK (km/h), the acceleration $\alpha$ (m/s$^2$), the throttle opening $\theta$TH, the grade resistance (climbing resistance) RG (kg) and the vehicle speed V. The vehicle speed V and the like are calculated from sensor outputs and the current gear position is obtained mainly from the ON/OFF pattern of the solenoids mentioned earlier.

The driving resistance is calculated by a special method using the subroutine shown in FIG. 8. The embodiment under discussion does not use a torque sensor or the like for ascertaining the driving resistance but determines it by calculation. Specifically, the vehicle dynamics can be obtained from the law of motion as Motive force $F$ − Driving resistance $R$ = (1)

(1 + Equivalent mass) × (Vehicle weight $W$/Gravitational acceleration $G$) × Acceleration $\alpha$ [kg]

On the other hand, the motive force F and the (total) driving resistance R can be obtained as Motive force $F$ = (Torque $T$ ×

Overall gear ratio $G/R$ × Transmission efficiency eta)/Effective tire radius $r$ [kg]

Driving resistance $R$ = (Rolling resistance $\mu O$ + (2)

Grade sin $\theta$) × Vehicle gross weight $Wr$ +

Aerodynamic drag ($\mu A \times V^2$) [kg]

(In the foregoing, the equivalent mass (equivalent mass coefficient) is a constant and V is the vehicle speed.)

The variables in the equation (2) are the vehicle gross weight Wr, which varies with the number of passengers and the amount of cargo, and the grade sin $\theta$, which differs depending on the inclination of the road surface, and all of these factors are included in the driving resistance. Therefore, by rewriting the aforesaid equation (1) there is obtained Driving resistance $R$ = (Motive force $F$) −

{(1 + equivalent mass) × Vehicle mass $M$ ×

Acceleration $\alpha$} [kg] (where vehicle mass $M$ = vehicle weight $W$/gravitational acceleration $G$).

Figure 9:
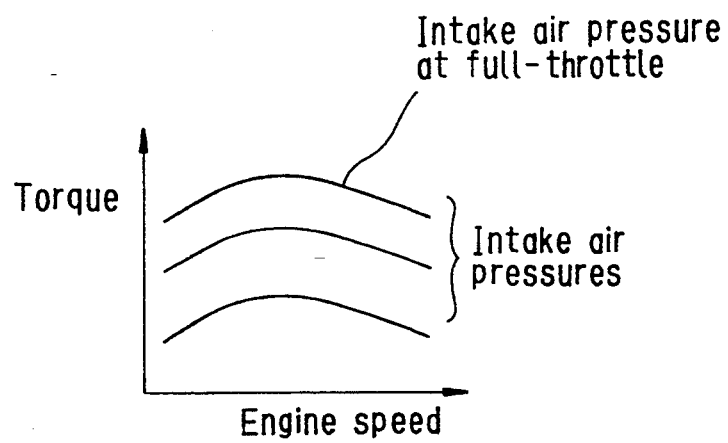
FIG. 9 a graph showing the characteristics of a map to be used in a torque retrieval referred to in FIG. 8 flow chart.
Figure 10:
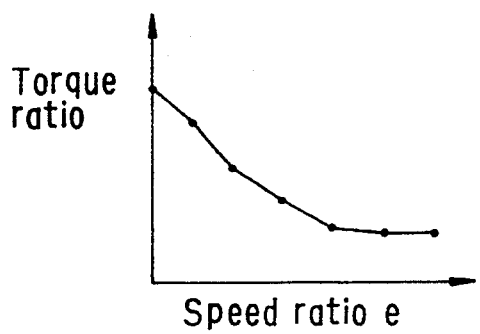
FIG. 10 is a graph explaining the characteristics of torque ratio defined with respect to speed ratio referred to in FIG. 8 flow chart.
Figure 11:
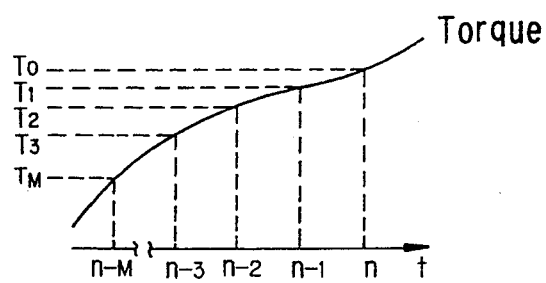
FIG. 11 is a graph explaining mean torque calculation referred to in FIG. 8 flow chart.
Figure 12:
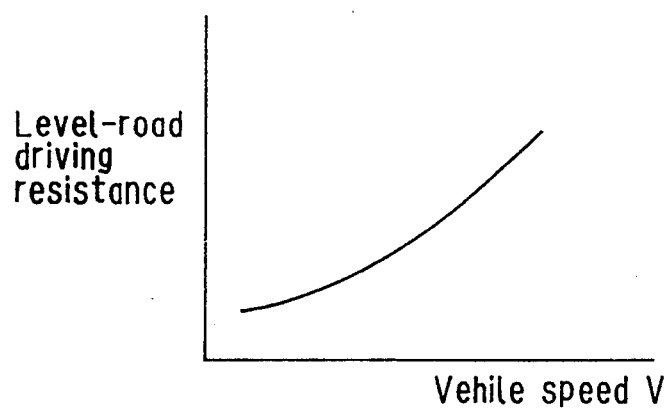
FIG. 12 is a graph showing the characteristics of a table of level-road driving resistance defined with respect to a vehicle speed referred to in FIG. 8 flow chart.

The subroutine of FIG. 8 will now be explained on the basis of the foregoing. The subroutine starts with step S100 in which the engine speed and the intake air pressure are used as address data for retrieving the approximate torque from a map having the characteristics shown in FIG. 9 stored in ROM. As shown in FIG. 9, the map is provided with separate sets of characteristics for different intake air pressures. Control then passes to step S102 in which the torque T is adjusted by multiplication by a torque ratio TR indicative of a torque increase of the torque converter retrieved from a table having the characteristics shown in FIG. 10. This retrieval is conducted by calculating the speed ratio e of the torque converter from the engine speed and the torque converter output speed and using the calculated value to retrieve the torque ratio TR from the table of FIG. 10. Control next passes to step S104 in which a moving average calculation is conducted as shown in FIG. 11 for compensating for the delay between the occurrence of a change in air intake pressure and the resulting change in engine output, to step S106 in which a check is made as to whether or not braking is being conducted and, if it is not, to step S108 in which the total driving resistance R is calculated according to the equation set out earlier. If it is found in step S106 that braking is being conducted, since the braking force makes it difficult to calculate the driving resistance with accuracy, control is passed to step S110 in which the value calculated in the preceding cycle is used. In either case, control then passes to step S112 in which the grade resistance RG is calculated by subtracting the level-road driving resistance from the total driving resistance R. The level-road driving resistance is obtained by tests and stored in ROM in advance. It has the characteristics shown in FIG. 12 and is retrieved for the calculation using the vehicle speed V as address data.

Figure 13:
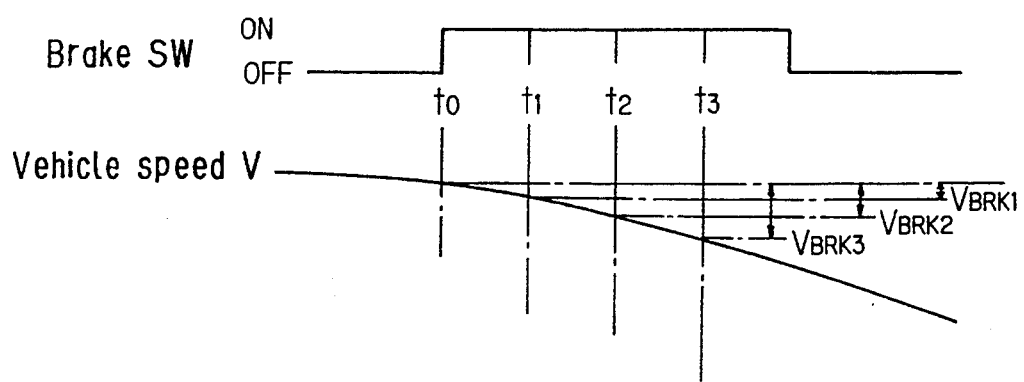
FIG. 13 is a graph explaining a vehicle speed during braking referred to in FIG. 8 flow chart.

The aforesaid parameters are calculated and detected in step S10 of FIG. 3. As shown in FIG. 13, the vehicle speed during braking VBRK is the amount of reduction in vehicle speed following the depression of the brake pedal at time t0 and is obtained from the vehicle speed as a function of measured time lapse following the detection of brake operation.

Control next passes to step S12 in which a first fuzzy reasoning is conducted for inferring the driver's intention to decelerate DEC, to step S14 in which the cumulative value DEC$_{n-m}$ up to the preceding cycle is renewed by adding thereto the value of DEC obtained in the current cycle and then to step S16 in which the second fuzzy reasoning for determining the gear position (ratio) is conducted on the basis of operating parameters including the intention to decelerate DEC. This fuzzy reasoning is described in detail in the aforesaid assignee's Laid-open Japanese Patent Publication No. 4(1992)-8964 (U.S. Ser. No. 691,066). Since the reasoning method itself is not a feature of the present invention, it will only be explained briefly with reference to FIG. 7.

First, the detected (calculated) parameters relating to the antecedent (IF part) of each rule are applied to the corresponding membership functions, the values on the vertical axes (membership values) are read, and the smallest of the values is taken as the degree of satisfaction of the rule. Next, the output value (position of the center of gravity and the weight) of the consequent (THEN part) of each rule is weighted by the degree of satisfaction of the antecedent and the average is calculated. That is, Fuzzy calculation output = Σ{(Degree of satisfaction of individual rules) × (Position of center of gravity of output) × (Weight)}/Σ {(Degree of satisfaction of individual rules) × (Weight)

It is also possible to use the conventional method in which the degree of satisfaction of the antecedent of each rule is used to truncate the output value, the truncated waveforms are then synthesized, and the center of gravity of the resulting synthesized waveform is obtained and used as the fuzzy calculation output.

Some additional explanation regarding the inference of driver's intention to decelerate according to FIG. 7 may be helpful, particularly as to why reasoning for ascertaining the intention of the driver is conducted in this way. The rules in the preceding figure (FIG. 6) relate to special, limited driving circumstances (hill-climbing, hill-descent and deceleration). Differently from hill-climbing and the like, which relate to the driving environment where the vehicle is located, deceleration is often an intended driving condition that arises from the driver's own desire. Rather than ascertaining it solely from physical quantities, therefore, from the point of realizing control matched to human feelings it is better to infer what the driver's intention is and to use the result together with other parameters to conduct comprehensive reasoning.

Figure 14:
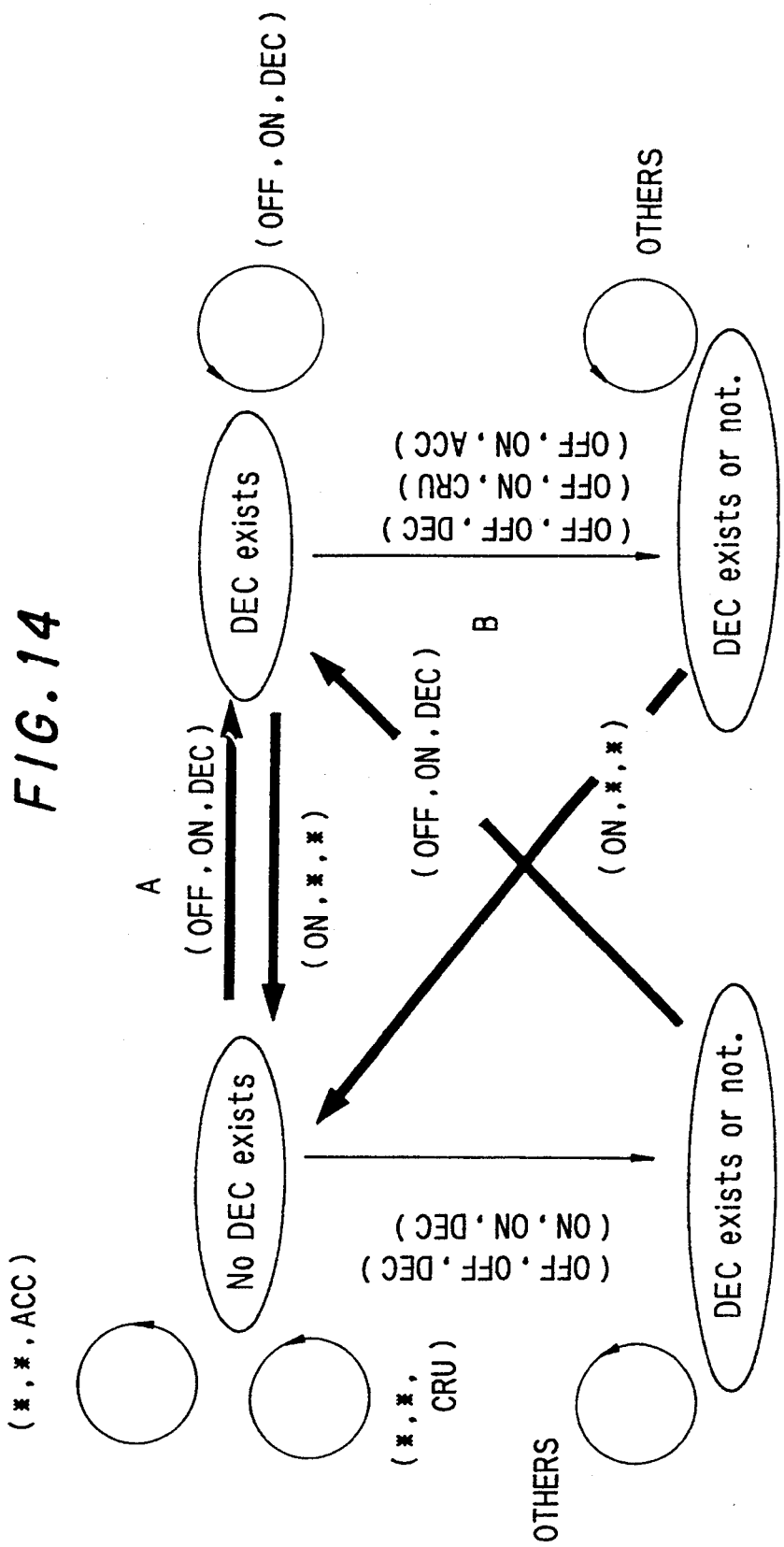
FIG. 14 is an explanatory view explaining inference of the driver's intention to decelerate.

The reasoning itself will now be explained with reference to FIG. 14. The driver's intention can only be estimated from the driving states and the manner in which he or she operates the vehicle controls. The result of the estimation can be expressed in only three ways. Taking intention to decelerate as an example, these would be: "no intention to decelerate exists," "intention to decelerate exists" and "intention to decelerate exists or not." FIG. 14 shows the transition among theses states. Where the driver-operated controls on which the estimation is based are the accelerator pedal (throttle valve) and the brakes, and the driving states are deceleration (DEC), cruise (CRU) and acceleration (ACC), the various combinations of these parameters shown in the drawing become possible. (A notation such as OFF, ON, DEC indicates that the accelerator pedal is released, the brake pedal depressed and the vehicle decelerating, while the asterisks are wild cards that can represent any of the states.) Although the driver's intention is known only to the driver, it is at least possible to conclude that an intention to decelerate is present when the accelerator pedal is released, the brake pedal depressed and the vehicle decelerating and that no intention to decelerate is present when the accelerator pedal is depressed. Moreover, this is the most that can be concluded. Namely, the fact that the accelerator pedal is released and the vehicle decelerating cannot be concluded to show intention to decelerate so long as the brake pedal is not depressed, and the fact that the vehicle is cruising or accelerating cannot be concluded to show lack of (no) intention to decelerate so long as the accelerator is released and the brake pedal depressed. The foregoing considerations were also used as the basis for rule drafting in the assignee's earlier Japanese patent publication. In the present embodiment, the driving states are classified even more finely by adding two more parameters to those already mentioned: the grade resistance and the vehicle speed.

Specifically, rule 12 is premised on a negative grade resistance, i.e. on hill-descent. Since a vehicle coasts when traveling down hill, if it should decelerate slightly, it can then be presumed to be in line with the driver's intention to shift down for obtaining a better engine braking response. As indicated by rules 10 and 11, the closer that the driver's intention to decelerate approaches 1.0, the more likely becomes a decision to shift down. Rules 13 and 14 are premised on a positive grade resistance, i.e. on level-road running or hill-climbing. In rule 13, the vehicle speed membership function is set to be large on the low speed side (i.e. the rule presumes low-speed driving on a level or uphill road), while in rule 14, it is set to be large on the high speed side (i.e. the rule presumes high-speed driving on a level or uphill road). Since, differently from rule 12, rule 13 is not premised on downhill coasting, it presumes that there is no driver's intention to decelerate unless there is a fair amount of deceleration. Since rule 14 is premised on high-speed driving, it presumes that a low level of brake operation should not be construed to indicate an intention to decelerate on the part of the driver unless there is a strong feeling of deceleration and, accordingly, a heavy deceleration.

In the flow chart of FIG. 3, control passes to step S18 in which rounding and a limitation check are conducted and then to step S20 in which in response to the checked gear position, a control value is output to the solenoids 36,38. As was mentioned earlier, the value obtained by the fuzzy reasoning is a weighted mean value and, as such, frequently includes a fractional part, so that the output gear position is also often a value containing a fractional part, such as 0.8. Rounding is therefore conducted for specifying the gear that is to be shifted to, and when the shift command value exceeds fourth gear, for example, it is limited to fourth gear. This is explained in detail in the assignee's earlier Japanese publication, and since it is not a feature of the present invention, will not be gone into further here.

Since as explained in the foregoing, the present embodiment ascertains the driver's intention to decelerate by conducting fuzzy reasoning on the basis of the throttle opening and the like and then determines the gear position by conducting fuzzy reasoning on the basis of a set of parameters including the driver's intention to decelerate, it is able to achieve sophisticated shift scheduling well matched to the sensibilities of the driver. Further, since the rules for ascertaining the intention to decelerate are drafted on the basis of operating states defined in terms of the grade resistance and vehicle speed as additional parameters, the driver's intention can be ascertained with increased accuracy. In addition, the use of two-stage fuzzy reasoning makes it possible to express the antecedents (IF parts) of the individual rules more simply.

Although the embodiment was explained with respect to the case where the fuzzy reasoning is conducted for inferring the driver's intention to decelerate, this is not limitative and it is alternatively possible to conduct fuzzy reasoning for ascertaining an intention to accelerate, an intention to save fuel and the like. Moreover, while the embodiment was explained as classifying driving states on the basis of the grade resistance and the vehicle speed, it is further possible to use the gear position (ratio) as an additional parameter enabling the classification to be made separately for each gear position (ratio). It is also possible to conduct the fuzzy reasoning using fuzzy relationships instead of fuzzy production rules as in the embodiment. In addition, instead of ascertaining engine load from the throttle opening, it is possible to ascertain it from the amount of depression of the accelerator pedal. While the embodiment was described as using two-stage reasoning, this is not limitative and the gear ratio can be determined by some other control technique such as PID control. Further, although this embodiment relates to an example employing a multi-step transmission, this is not limitative and the invention can also be applied to a vehicle with a continuously variable transmission.

A second embodiment of the invention will now be explained with reference to the flow chart of FIG. 15, focusing primarily on the points of difference relative to the first embodiment. The program starts with step S200 in which, as in the first embodiment, the parameters are calculated/detected, whereafter control passes to step S202 in which the driver's intention to decelerate DEC is inferred by a first fuzzy reasoning using the rules set out in connection with the first embodiment and then to step S204 in which the driver's intention to decelerate inferred by the reasoning is checked. This will be explained with reference to the flow chart of FIG. 16.

In step 300 of this subroutine the cumulative value $DEC_{n-m}$ up to the preceding cycle is renewed by adding thereto the value of DEC obtained in the current cycle, whereafter control passes through steps S302–S308 for carrying out a limitation check to ensure that the cumulative value of DEC falls between 1.0 and 0, inclusive. This check is conducted because the membership function of the driver's intention to decelerate in rules 10–12 are set between 1.0 and 0. Control then passes to step S312 in which it is determined whether or not the vehicle speed V is below a prescribed value VDEC, and if it is, to step S312 in which the driver's intention to decelerate is determined to be zero. The prescribed value VDEC represents a vehicle speed that is so low as to make it meaningless to shift down even if the driver should be inferred to have the intention to decelerate.

Control next goes to step S314 in which it is discriminated whether or not braking is being still conducted, and if it is not, to step S316 in which it is discriminated whether or not the gear position is fourth (top speed), and if it is, to step S318 in which the driver's intention to decelerate is determined to be zero. If it is found in step S316 that the gear position is not fourth, control passes to step S320 in which it is discriminated whether or not the gear position is third, and if it is, to step S322 in which the cumulative value of the driver's intention to decelerate is compared with a prescribed value DEC3RD of, for example, 0.5, and if it is found to exceed this value, to step S324 in which the driver's intention to decelerate is determined to be the prescribed value DEC3RD. If it is found in step S314 that braking is being conducted, control passes to step S326 in which the throttle opening $\theta TH$ is compared with a prescribed value $\theta THDEC$, and if it is larger than the prescribed value, to step S316 and the following steps. The prescribed value is set to a relatively large opening of around 20 degrees. If the result of the discrimination in either step S326 or S320 is negative, the subroutine is terminated immediately.

Figure 16:
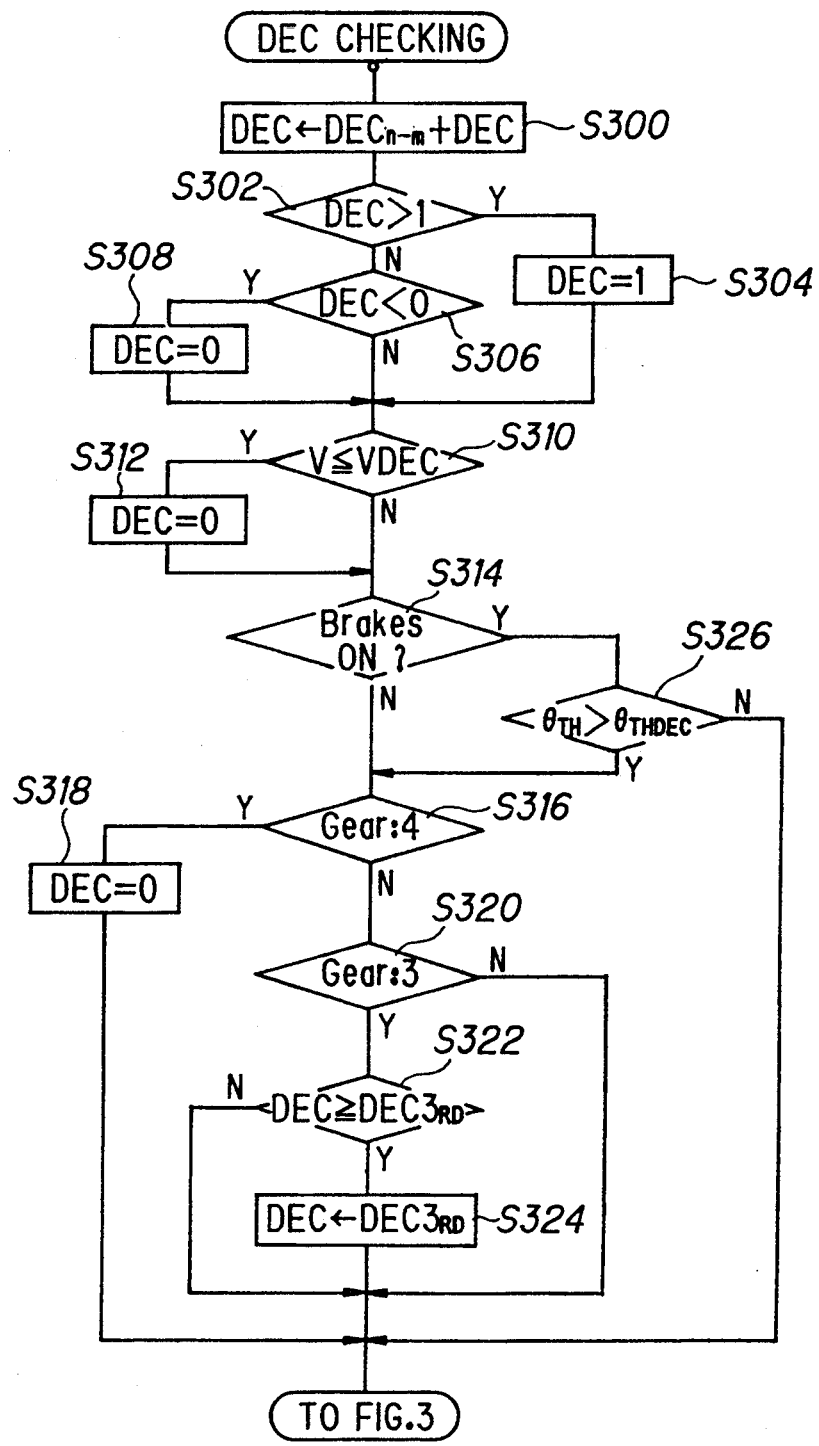
FIG. 16 is a flow chart showing checking of the driver's intention to decelerate referred to in FIG. 15 flow chart.

The basic object of the invention is to infer the driver's intention to decelerate and modify the shift scheduling so as to produce an engine braking response when the intention to decelerate is found to exist, thereby providing control which achieves operation that gives the impression of being like that of an experienced driver operating a vehicle with a manual transmission, even when driving through mountainous areas. However, if the adjustment according to the subroutine of FIG. 16 is not made, once the system has concluded that the driver's intention to decelerate has risen it will continue to maintain this conclusion even after the brake pedal is released. If the brakes are then reapplied, a shiftdown operation, say from fourth to third gear, is liable to occur within a relatively short time, which would not be faithful to the driver's intention. On the other hand, once engine braking effect has been invoked by shifting down in response to a rise in the intention to decelerate, the system will maintain its conclusion regarding the intention to decelerate even if the brake pedal is thereafter released. While this is in agreement with the driver's intention to accept the braking effect of the engine, if the driver releases the brake pedal before the shiftdown to third gear occurs in response to increasing the intention to decelerate, this can be interpreted to mean that, at least for now, the driver has abandoned his or her intention to decelerate and no longer desires to use the engine braking effect. The system is required to respond accordingly. In steps S316 and S318 of the flow chart of FIG. 16, therefore, the intention to decelerate is initialized by setting it to zero. For a similar reason, in step S326 the situation is handled in the same way when the throttle opening is greater than the prescribed value, even when the brakes are being applied. This is because the driver can be assumed to have abandoned his or her desire to decelerate when the throttle opening is large.

It is thus preferable to treat the value of the driver's intention to decelerate in different ways before and after shiftdown to third gear. While this is complicated and difficult to achieve through the drafting of rules, it can be easily accomplished by introducing a correction subroutine separate of the illustrated fuzzy reasoning. The use of different correction amounts for fourth and third gear in the flow chart of FIG. 16 is based on the same thinking. Since the reason for shifting from fourth gear to third gear can be assumed to be different from that for shifting from third gear to second gear, it is difficult to express both cases using a single intention to decelerate. The separate routine established in this embodiment provides a simple solution to this difficulty.

Figure 15:
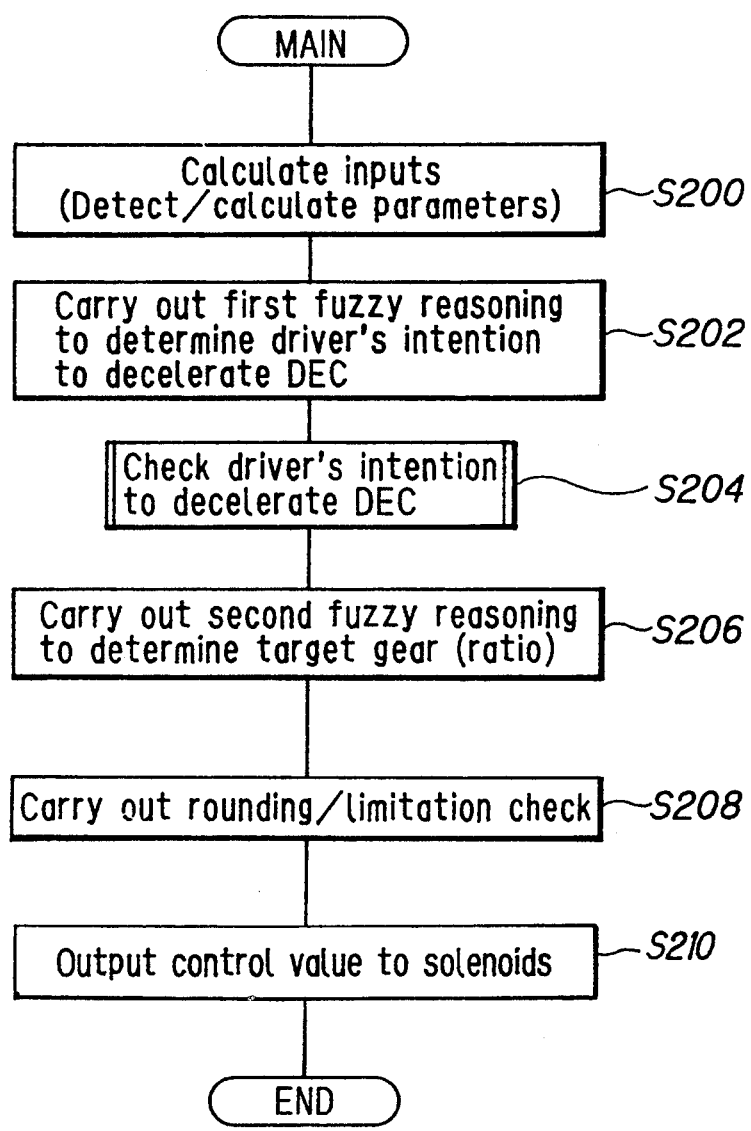
FIG. 15 is a flow chart, similar to FIG. 3, but showing a main routine flow chart according to a second embodiment of the present invention.

In the flow chart of FIG. 15, control next passes to step S206 and the ensuing steps for determining the gear position through a second fuzzy reasoning. As the operations involved are the same as those explained earlier with reference to the first embodiment, they will not be explained again here.

Since, as explained in the foregoing, the second embodiment ascertains the driver's intention to decelerate by conducting fuzzy reasoning on the basis of the throttle opening and the like and then determines the gear position by conducting fuzzy reasoning on the basis of a set of parameters including the driver's intention to decelerate, it is able achieve sophisticated shift scheduling well matched to the intention of the driver.

Moreover, the value of the driver's intention to decelerate determined by the reasoning is treated differently before and after shifting down to third gear. After the shift to third gear has been made, the value of the intention to decelerate is maintained to some degree so as to enable a further shiftdown or the holding of the same gear position. Before the shift to third gear, on the other hand, the value of the intention to decelerate is canceled when the driver releases the brake pedal so that even if the driver again depresses the brake pedal, no undesired shiftdown will occur within a short time. Further, since the adjustment for this is implemented by a subroutine separate of the fuzzy reasoning, no need arises to increase the number of rules or the volume of the fuzzy reasoning operations. In addition, the fact that the correction amount used for the adjustment is changed depending on the gear position makes it possible ascertain the driver's intention to decelerate more precisely using a simple arrangement.

Another advantage is that in inferring the driver's intention to decelerate the driving states are classified even more finely by the additional use of the vehicle speed and the grade resistance as parameters, thus making it possible to ascertain the driver's intention with a high level of accuracy. Also, the use of two-stage fuzzy reasoning makes it possible to express the antecedents (IF parts) of the individual rules more simply.

Figure 17:
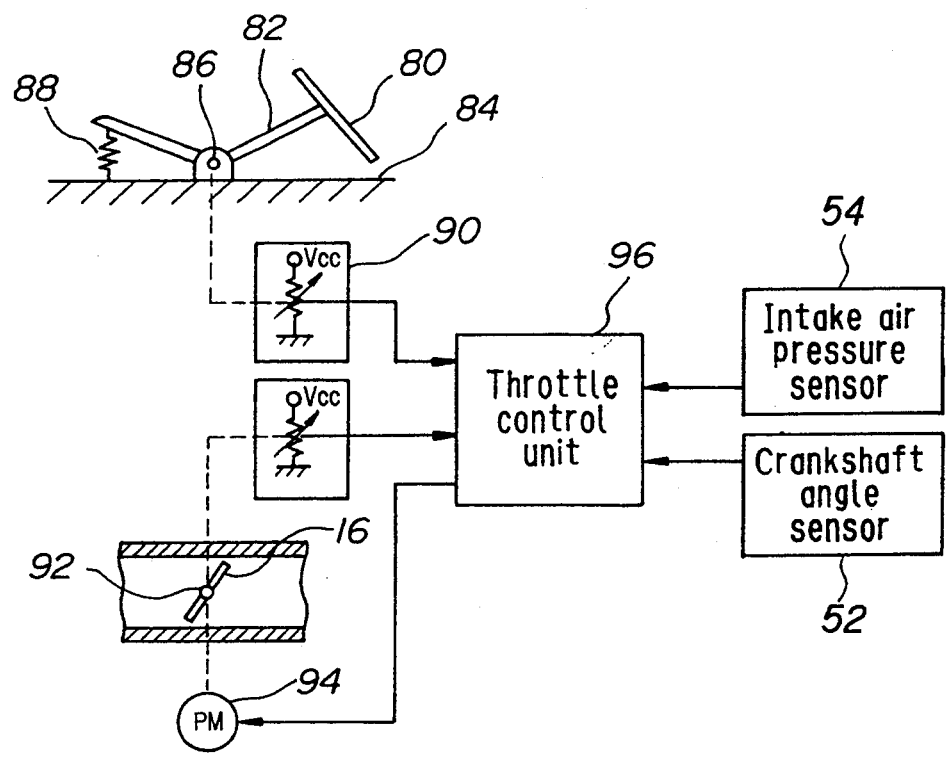
FIG. 17 is a schematic diagram of a throttle control system according to a third embodiment of the present invention.

FIG. 17 shows a third embodiment of the invention provided with a system for controlling the throttle opening by means of a stepper motor.

An accelerator pedal 80 is connected to one end of an arm 82 of V-like sectional shape which is pivoted on the floor 84 of the vehicle by a shaft 86. The other end of the arm 82 is attached to a return spring which biases the accelerator pedal 80 toward the idling position. The shaft 86 is fitted with a potentiometer serving as an accelerator position sensor 90. The accelerator position sensor 90 outputs a voltage value proportional to the angle that the arm 82 has rotated about the shaft 86 from idling position. The throttle valve 16 has a shaft 92 connected with the rotating shaft (not shown) of a stepper motor 94. The throttle valve 16 is thus opened and closed by the stepper motor 94. The throttle position sensor 50 detects the degree of opening of the throttle valve 16 and forwards a signal representing the same to a throttle control unit 96. The values detected by the intake air pressure sensor 54 and the crankshaft angle sensor 52 are also sent to the throttle control unit 96. Based on the detected values it receives, the throttle control unit 96 controls the throttle opening in accordance with prescribed characteristics. Using this arrangement, it is possible to control the throttle opening on the basis of parameters including the driver's intention to decelerate inferred by fuzzy reasoning in accordance with the first embodiment.

Figure 18:
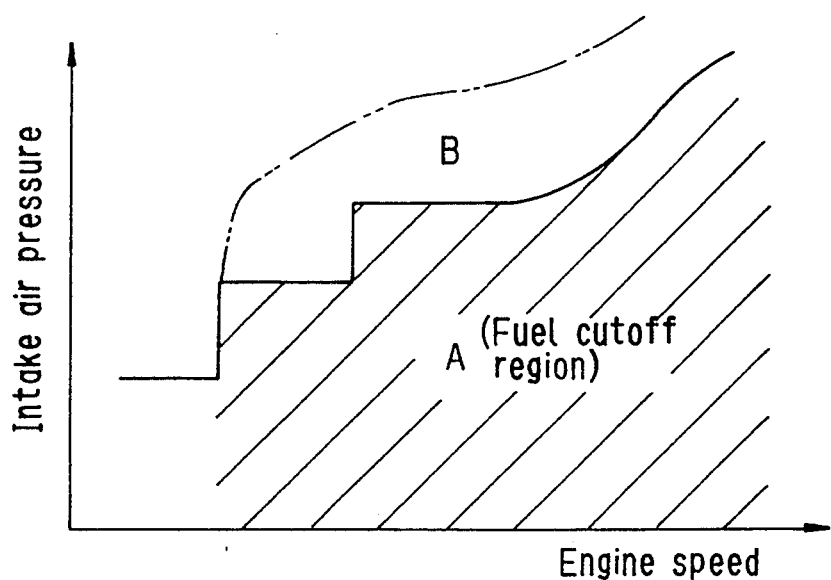
FIG. 18 is an explanatory graph showing a fourth embodiment of the present invention.

In the fourth embodiment of the invention illustrated in FIG. 18, inference of the driver's intention to decelerate is applied in fuel injection control. In the fuel injection control, a basic amount of fuel injection (expressed in terms of injection time) is determined in light of the engine speed and the engine load and, as shown in FIG. 18, the supply of fuel is cut off within a prescribe region during deceleration, thereby enhancing fuel efficiency. The fuel cutoff is implemented on the condition that a prescribed time has lapsed after the establishment of a state in which the throttle is full closed and the load and engine speed are within prescribed ranges. The fuel cutoff region is indicated by the reference symbol A in the figure. If in addition to the foregoing conditions for fuel cutoff, the condition that the driver's intention to decelerate has to be not less that a prescribed level is introduced, it becomes possible to implement fuel cutoff even within the region indicated by the reference symbol B, thus further enhancing the fuel economy.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling a multi-step geared automatic transmission of a vehicle, including:
   first means for determining parameters at least indicating an engine load, a vehicle speed at braking and a vehicle acceleration;
   second means for carrying out a first fuzzy reasoning to infer a value indicative of the driver's intention to decelerate;
   third means for carrying out a second fuzzy reasoning using the parameters and the inferred value to determine a gear ratio to be shifted to; and
   actuator means for driving a gear ratio shift mechanism in response to the determined gear ratio;
   wherein the improvement comprises:
   said first means further determines parameters indicating a vehicle speed and indicating if the vehicle is hill climbing or hill descending, said parameter of vehicle hill climbing or hill descending including at least a value of grade resistance obtained by subtracting a value of driving resistance on a level road from a value of current total driving resistance; and
   said second means carries out the first fuzzy reasoning at least using one of the parameters determined by said first means based on fuzzy production rules directed toward driving conditions including hill climbing and hill descending.

2. A system for controlling a multi-step geared automatic transmission of a vehicle, comprising:
   first means for determining parameters at least indicative of an engine load, a vehicle acceleration, a vehicle speed at braking and a driving resistance;
   second means for carrying out a first fuzzy reasoning to infer a value indicative of the driver's intention to decelerate at least using one of the parameters determined by said first means;
   third means for carrying out a checking if braking is still in progress and if found not, correcting the inferred value;
   fourth means for carrying out a second fuzzy reasoning using at least one of the parameters determined by said first means and the value inferred by said second means or the value corrected by said third means to determine a gear ratio to be shifted to; and
   actuator means for driving a gear ratio shift mechanism in response to the determined gear ratio.

3. A system according to claim 2, wherein said first means also determined a parameter of the gear ratio currently engaged, and said third means corrects the inferred value in response to the gear position currently engaged.

4. A system according to claim 3, wherein said third means cancels the inferred value if the gear position currently engaged is the top gear position of the transmission.

5. A system according to claim 3, wherein said third means carries out the checking if the engine load exceeds a prescribed value and if it does, cancels the inferred value when the gear position currently engaged is the top gear position of the transmission.

6. A system according to claim 3, wherein said third means changes the inferred value to a predetermined value if the gear position currently engaged is less than the top gear position of the transmission.

7. A system according to claim 3, wherein said third means carries out the checking if the engine load exceeds a prescribed value and if it does, changes the inferred value to a predetermined value when the gear position currently engaged is less than the top gear position of the transmission.

8. A system according to claim 7, wherein the gear position currently engaged is a gear position less by one gear position than a top gear position.

9. A system according to claim 8, wherein the automatic transmission has four forward speed gear positions and the gear position less by one gear position than the top gear position is third gear position.

* * * * *